April 30, 1940. K. C. MONROE 2,198,881
DUPLEX INTERLOCKED HYDRAULIC BROACHING MACHINE
Filed March 28, 1938 4 Sheets-Sheet 4
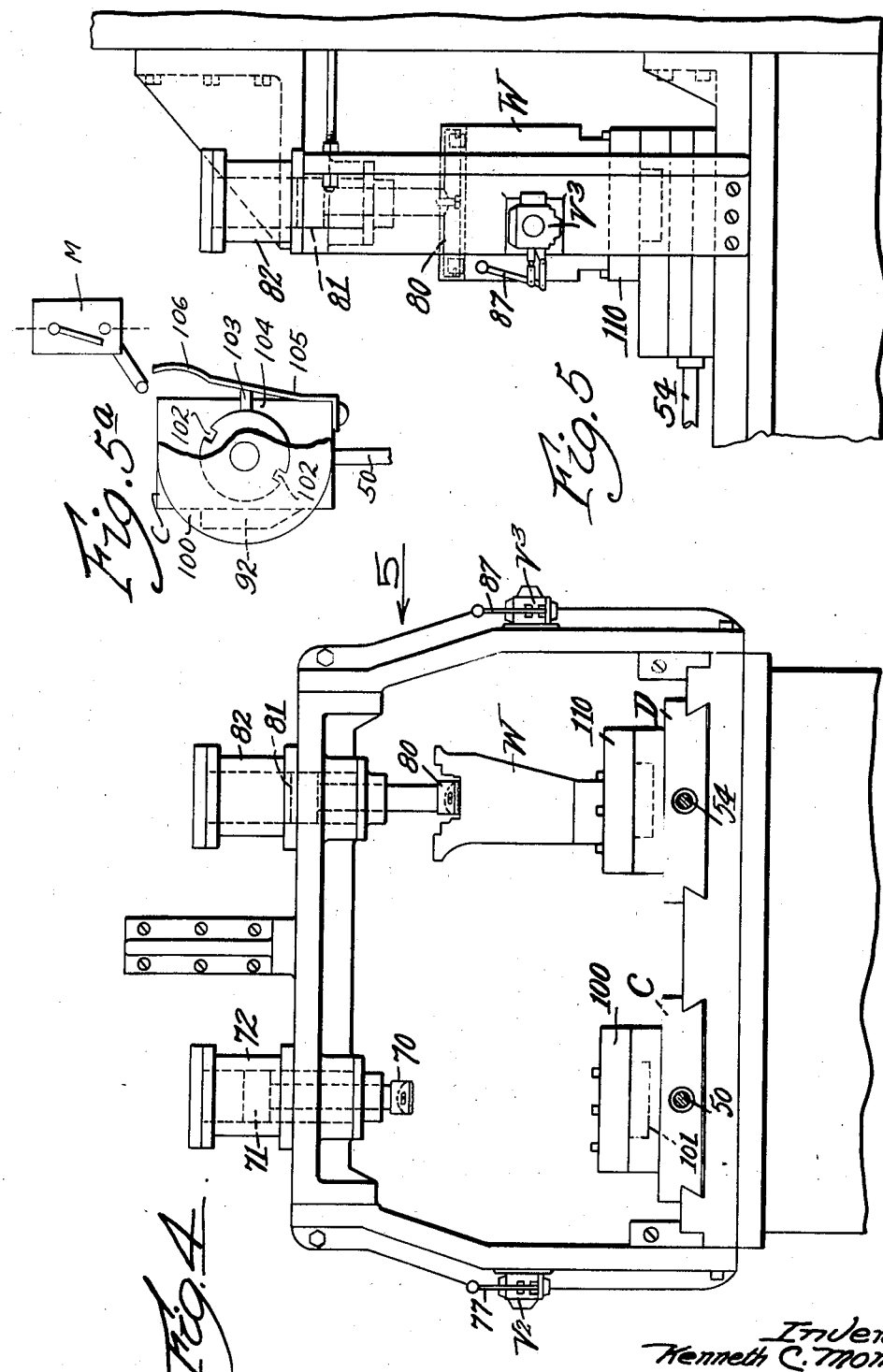

Patented Apr. 30, 1940

2,198,881

UNITED STATES PATENT OFFICE 2,198,881

DUPLEX INTERLOCKED HYDRAULIC BROACHING MACHINE

Kenneth C. Monroe, Hudson, Mass., assignor to The Lapointe Machine Tool Company, Hudson, Mass., a corporation of Maine Application March 28, 1938, Serial No. 198,513

2 Claims. (Cl. 90—33)

This invention relates to a duplex hydraulic broaching machine particularly designed for surface broaching operations, and further relates to certain hydraulic control devices and electric interlocks therefor.

It is the general object of my present invention to provide a duplex hydraulic broaching machine so controlled and interlocked that a harmful sequence of operations cannot be produced.

More specifically, I provide a duplex broaching machine in which the work supports cannot be moved while the work is clamped thereon, and in which a return stroke of a broach cannot be made until the associated work support is shifted to displace the work piece from broaching position.

I also positively prevent a working stroke of either broaching ram unless the associated work support is in operative position and unless the work thereon is duly clamped. If the work is mounted on a turn-table on the work support, the table must also be in one of its predetermined angular positions before the broaching ram can be started.

I further provide a single hand-operated switch so connected that successive separate closings of said switch will effect successive prearranged operations of the broaching machine and its associated parts in a definite order. Other features of the machine and of the interlocked sequence of operations will be hereinafter described in detail.

My invention further relates to arrangements and combinations of parts which will be hereinafter described and more particularly pointed out in the appended claims.

A preferred form of my invention is shown in the drawings, in which

Fig. 4 is a front elevation of the work supports, work-clamping devices, and associated parts;

Fig. 5 is a side elevation of the parts shown in Fig. 4; and

Fig. 5a is a detail view to be described.

Figure 1:
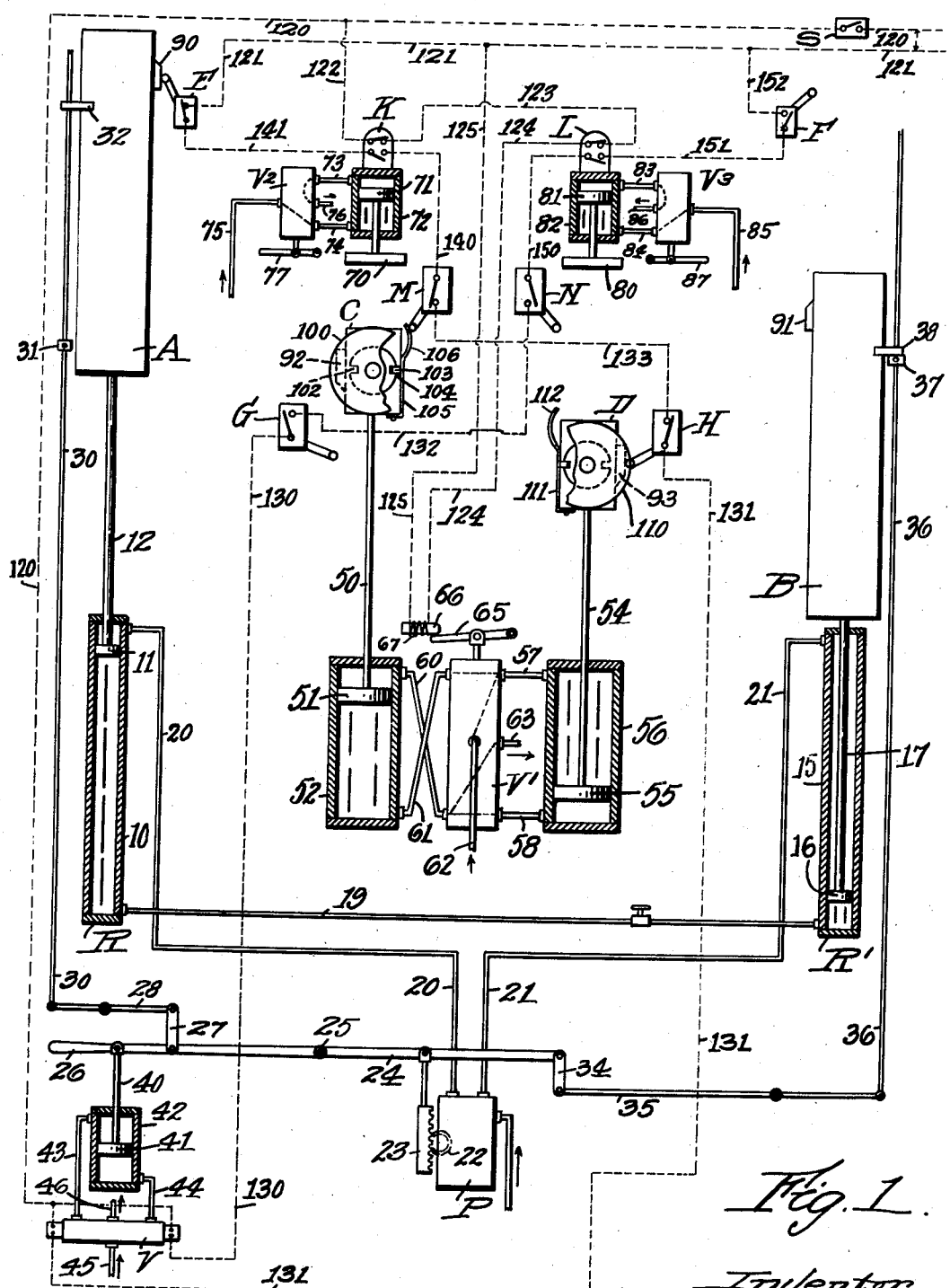
Fig. 1 is a diagrammatic representation of my improved duplex broaching machine, with its hydraulic control and electric interlock.

Referring to Fig. 1, I have indicated diagrammatically a duplex hydraulic broaching machine having slides A and B to which surface broaches or other tools may be secured. The slide A is operated by a ram R comprising a cylinder 10 and piston 11 connected by a piston rod 12 to the slide A. A ram R' is similarly provided for the slide B and comprises a cylinder 15, piston 16 and piston-rod 17.

The cylinders 10 and 15 are cross connected by a pipe 19 and are connected by pressure supply pipes 20 and 21 to a variable discharge reversible pump P which may be of the general type shown in West Patent, No. 1,722,832.

Suitable provision is made for reversing and controlling the discharge of the pump P, which provision includes a pinion 22 and rack bar 23 which is connected to a pump control lever 24. The lever 24 is pivoted at 25 and is provided with a handle 26 for manual operation.

The lever 24 is connected by a link 27 to a lever 28, which in turn is connected to a knock-off rod 30 having a collar 31 adjustably secured thereon and positioned for engagement by an arm 32 on the slide A as the slide completes its working stroke. The lever 24 is also connected by a link 34 and lever 35 to a second knock-off rod 36 having an adjustable collar 37 positioned for engagement by an arm 38 on the slide B.

The pump control lever 24 also has a pin-and-slot connection with the upper end of a piston rod 40 connected to a piston 41 in a pump-shifting cylinder 42. The cylinder 42 is connected by pipes 43 and 44 to a control valve V having a connection 45 to an independent supply of liquid under pressure and having an exhaust connection 46.

The valve V may be shifted in either direction by energizing one of the two solenoid coils which are mounted in the two ends of the valve V. Each of these coils is effective to shift the valve in a defined direction. When the coil circuit is broken, the valve returns at once to neutral or mid position, with both ends of the cylinder 42 connected to a sump, not shown.

My improved broaching machine is also provided with a pair of work supports C and D (Figs. 4 and 5) which are each slidable forward in the machine to inoperative or loading position and which are slidable rearward to operative or broaching position. The work support C is connected by a piston rod 50 (Fig. 1) to a piston 51 in a cylinder 52, and the work support D is connected by a piston rod 54 to a piston 55 in a cylinder 56. The cylinder 56 is connected by pipes 57 and 58 to a control valve V', and the cylinder 52 is similarly connected to the valve V' by crossed pipes 60 and 61.

The connections are such that pressure in the pipe 57 is simultaneously applied through the pipe 61, and that pressure in the pipe 58 is simultaneously applied through the pipe 60. These reverse connections between the valve V' and cylinders 52 and 56 cause the pistons 51 and 55 and the work supports C and D to move simultaneously in opposite directions.

The valve V' has a supply pipe 62 for liquid under constant pressure and an exhaust pipe 63, and is manually shiftable to reverse the connections to the cylinders 52 and 56 by a hand lever 65, which lever is, however, normally locked by a plunger 66 in a solenoid coil 67. The valve V' can be shifted only while the plunger 66 is withdrawn, and the valve is locked at all times except when the solenoid coil 67 is energized.

A device 70 for clamping the work on the work support C is actuated by a piston 71 in a cylinder 72 (Figs. 4 and 5) mounted on the fixed frame of the machine and connected by pipes 73 and 74 to a valve V² having a supply pipe 75 and exhaust pipe 76 and manually operated by a hand lever 77. When the valve is shifted to admit pressure through the upper pipe 73, the clamping device 70 moves downward to engage the work and hold it firmly on the work support C. The device 70 does not move forward with the work support.

A device 80 for clamping the work on the work support D is similarly actuated by a piston 81 in a fixed cylinder 82 connected by upper and lower pipes 83 and 84 to a valve V³ having a supply pipe 85 and exhaust pipe 86 and movable by a hand lever 87.

A slide switch E is normally open but is closed when engaged by a cam plate 90 on the slide A and a similar slide switch F is normally open but is closed when engaged by a cam plate 91 on the slide B.

A limit switch G is normally open but is closed when engaged by a cam plate 92 on the work support C as the work support reaches its extreme forward or loading position. A similar limit switch H is normally open but is closed when engaged by a cam plate 93 on the work support D, as the work support D reaches forward or loading position.

A pressure-operated double switch K is mounted on the cylinder 72 and a similar switch L is mounted on the cylinder 82. Each of these switches controls two separate circuits and is so constructed that the upper circuit is closed and the lower circuit open when pressure is applied through one of the pipes 74 or 84 to the lower end of the clamping cylinder 72 or 82, thereby unclamping the work.

If pressure is applied through one of the upper pipes 73 or 83 to clamp the work, the double switches K and L are reversed, closing the lower circuits and opening the upper circuits through these switches.

Under some conditions of operation, the work W on the work support C will desirably be mounted on a turn-table 100, (Fig. 4) so that the work may be reversed and so that a second surface may be broached before removal of the work from the work support.

In order to insure that the turn-table 100 shall be locked in some one of its predetermined angular positions before a broaching operation can be performed, I provide special protective devices which will now be described. For purposes of illustration, I have shown the turn-table 100 as provided with a hub portion 101 having recesses or sockets 102 (Figs. 1 and 5ᵃ) spaced apart 180°, it being understood that any number of sockets in any desired angular relation may be substituted.

I also provide a plunger 103 slidable in a bearing 104 in the work support C and extending into one of the sockets 102 when normally seated. The plunger 103 is mounted on a spring plate 105 fixed to the end of the work support C and the plate 105 has a cam-shaped handle portion 106.

A normally-open protective index switch M is positioned to be engaged and closed by the cam portion 106 of the spring plate 105 as the work support C reaches rearward or broaching position, provided the spring plate is in normal position, with the plunger 103 seated and the turn-table 100 locked, as shown in Fig. 1. If the turn-table is not accurately positioned, the plunger 103 will be held out of normal position, as shown in Fig. 5ᵃ and the cam portion 106 will be laterally displaced, so that it cannot engage and close the index switch M. The closing of the switch M is thus dependent both on correct indexing and locking of the turn-table 100 and also on movement of the work support C to full rearward or broaching position.

The work support D may be provided with a similar turn-table 110 (Figs. 4 and 5) and with similar locking structure, including a spring-plate 111 (Fig. 1) having a cam portion 112 positioned to engage and close a normally open protective index switch N when the work support D and turn-table 110 are moved rearward to broaching position.

Even if the turn-tables 100 and 110 are removed, the switches M and N continue to insure full rearward movement of the work supports.

If the switch M or N which corresponds to the work support in broaching position is not closed, no broaching operation can be performed, as will be hereinafter explained.

Current for the electric interlock is supplied through line wires 120 and 121, and a hand-operated switch or push-button S is provided in the line wire 120. The wire 120 is connected to both solenoid coils in the valve V and also by a branch wire 122 to the upper part of the pressure switch K.

A wire 123 connects terminals in the upper parts of the pressure switches K and L, and a wire 124 connects the upper part of the switch L to the solenoid coil 67, the return circuit being through a wire 125 to the line wire 121.

The right-hand solenoid in the switch V is connected by a wire 130 to the limit switch G, and the left-hand solenoid is connected by a wire 131 to the limit switch H. The switch G is connected by a wire 132 to the index switch N, and the switch H is connected by a wire 133 to the index switch M.

A wire 140 connects the index switch M to the lower part of the pressure switch K and a wire 141 connects the lower part of the pressure switch K to the slide switch E, which in turn is connected to the line wire 121.

The index switch N is connected by a wire 150 to the lower part of the pressure switch L, which in turn is connected through a wire 151 to the slide switch F and thence through a branch wire connection 152 to the line wire 121.

Having described the details of construction of my improved broaching machine and of the hydraulic control and electric interlock therefor, I will now describe its operation:

Assuming that the parts are in the position shown in Fig. 1, with a piece of work mounted on the work support C and moved rearward to broaching position, the operative procedure will be as follows:

The handle 77 of the valve V² will now be moved downward, admitting oil under pressure to the upper end of the cylinder 72 and forcing the member 70 downward to engage and clamp the work. This application of pressure to the upper end of the cylinder 72 reverses the pressure switch K, closing the lower circuit and opening the upper circuit through said switch.

Figure 2:
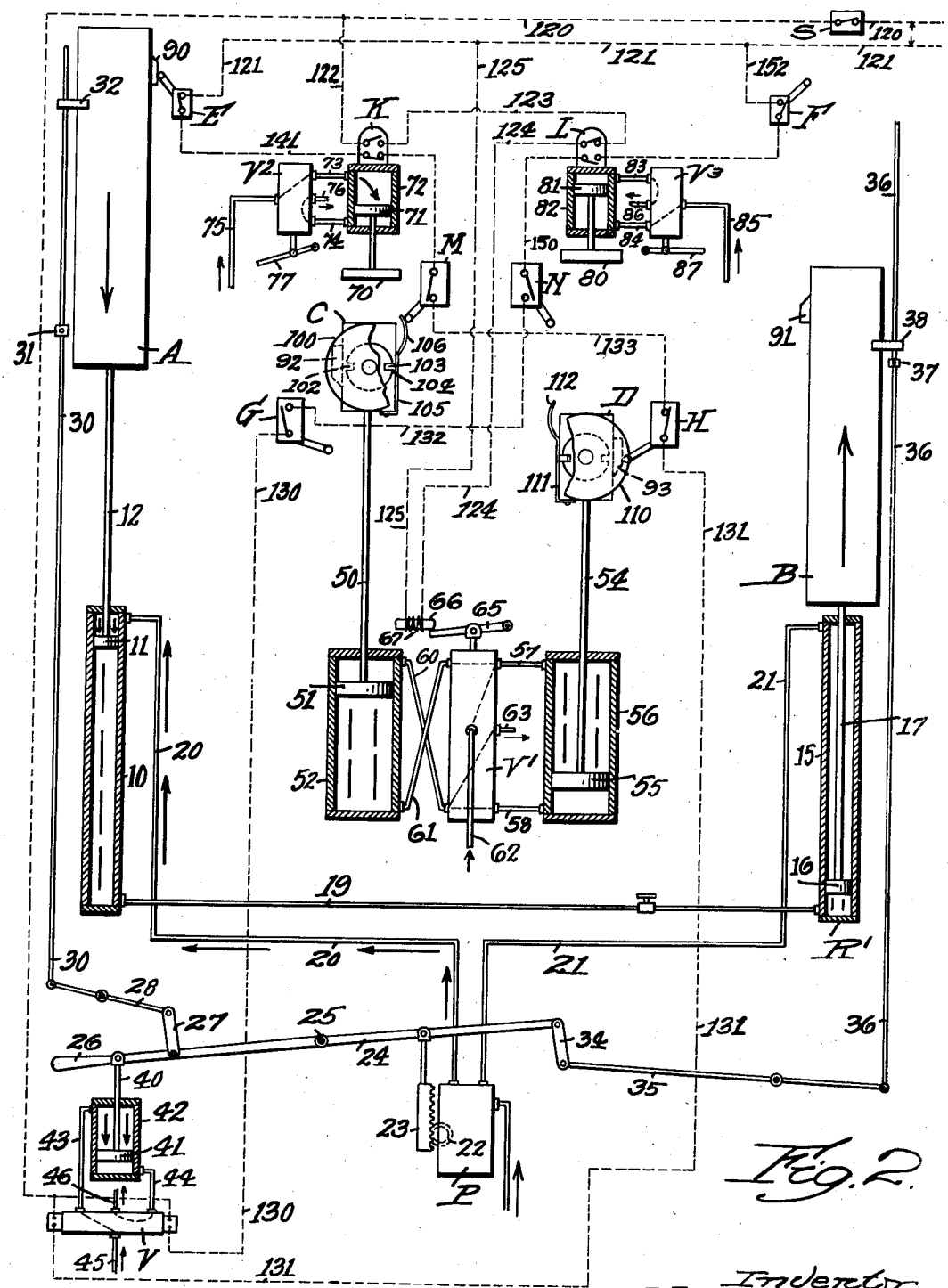
Figs. 2 and 3 are similar views but show different operative conditions.

If the hand switch S is now closed, a circuit will be completed as shown in Fig. 2 from the line wire 120 through the left-hand solenoid in the valve V, wire 131, limit switch H, wire 133, index switch M, wire 140, pressure switch K, wire 141, and slide switch E back to the line wire 121.

The valve V is therefore automatically shifted to the left, admitting oil under pressure above the piston 41 and shifting the pump P to supply oil under pressure through the pipe 20 to the upper end of the cylinder 10, thus causing the slide A to move downward, carrying the broach tool and performing a broaching operation on the work.

As soon as the slide A starts to move downward, the described circuit is broken by the opening of the slide switch E, whereupon the valve V automatically returns to mid or neutral position, with both ends of the pump-shifting cylinder 42 connected to atmosphere. The lever 24 is not shifted, however, and the pump P continues to force the piston 11 downwards in the cylinder 10 until the arm 32 on the slide A engages the collar 31 and positively returns the lever 24 to mid or neutral position, whereupon the machine comes to rest.

Before the work supports can be shifted, it is now necessary to move the lever 77 upward to raise the member 70 and unclamp the work. By so doing, the pressure switch K is returned to the condition shown in Fig. 1.

The switch S can then be closed to complete a circuit from the wire 120 through the wire 122, upper part of switch K, wire 123, upper part of switch L and wire 124 to the solenoid coil 67 and through the wire 125 back to the line wire 121.

Figure 3:
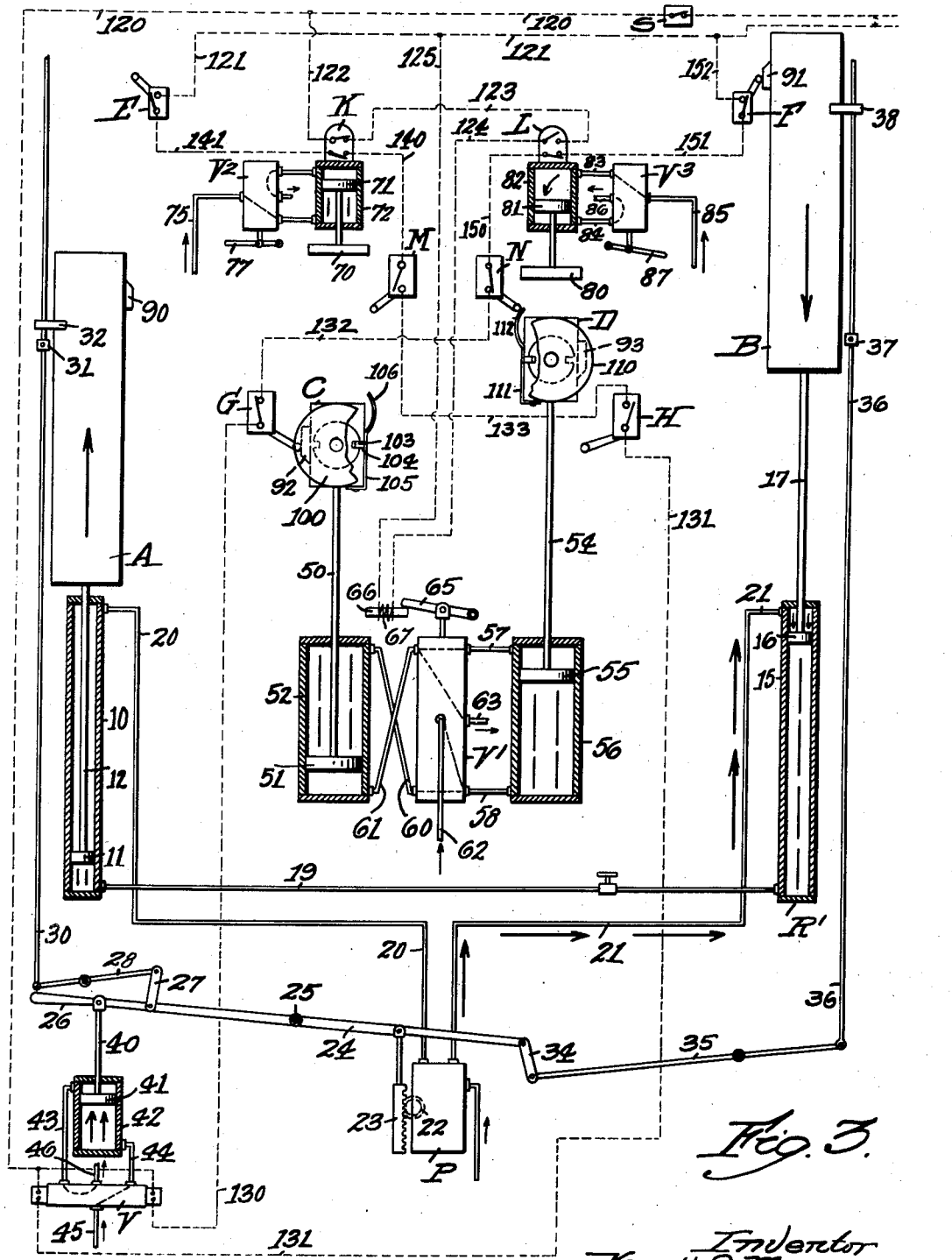

The coil 67 is thus energized, withdrawing the plunger 66 and permitting the operator to raise the hand lever 65 of the valve V′, thus reversing the connections to the cylinders 52 and 56 and causing the work support C to advance and the work support D to move rearward to the positions indicated in Fig. 3.

The handle 87 is then moved downward to shift the valve V³ to apply pressure to the upper end of the work-clamping cylinder 82, thereby clamping the work and reversing the pressure switch L. This breaks the circuit of the solenoid coil 67 and prevents any further movement of the work supports so long as the work is clamped by the member 80.

The switches are then in the positions shown in Fig. 3, and by manually closing the switch S, a circuit can be completed from the line wire 120 to the solenoid coil in the right-hand end of the valve V and thence through the wire 130, limit switch G, wire 132, index switch N, wire 150, lower part of pressure switch L, wire 151, slide switch F and wire 152 to the line wire 121.

The valve V will thereupon shift automatically to the right, admitting oil under pressure to the lower end of the pump-shifting cylinder 42 and shifting the lever 24 and rack bar 23 to the position shown in Fig. 3.

The pump thereupon supplies oil under pressure through the pipe 21 to the upper end of the cylinder 15, thereby causing the slide B to move downward for a broaching stroke, upon the completion of which the pump is returned to neutral position by the operation of the knock-off arm 38.

At the end of this broaching operation, the broaching slides A and B will be in the initial positions shown in Fig. 1, but the work supports C and D will be in the reverse positions shown in Fig. 3.

The work on the work support D is then unclamped, thereby reversing the pressure switch L. The work on the work support C is either rotated to a new predetermined angular position or is removed and replaced by a new piece of work, after which the switch S is closed to release the lever 65 and the lever is shifted to reverse the connections to the cylinders 52 and 56, causing the work supports C and D to return to the position shown in Fig. 1, thus completing the cycle of operations.

It will be noted that the machine is so controlled and interlocked that the lever 65 cannot be released to effect forward or rearward movement of the work supports so long as clamping pressure is being applied in the upper end of either of the work-clamping cylinders 72 or 82.

Furthermore, no broaching operation can take place unless one work support is in its rearmost position, is accurately indexed, and has the work thereon securely clamped in position. It is also necessary that the second work support be in its extreme forward or loading position, and that the broaching slide A or B which is about to become operative be at the limit of its return travel.

It is also impossible to accomplish a return movement of a broach until the broached piece of work has been unclamped and until the associated work support has been moved forward to shift the work out of the path of the returning broach.

Attention is also called to the fact that successive closings of a single manual switch S effect all of the desired automatic operations of the machine, provided certain intervening manual operations are performed in a predetermined sequence. If these manual operations are not so performed, or are performed in the wrong sequence, no harm is done but the machine simply refuses to operate and remains at rest.

Having thus described my invention and the advantages thereof, I do not wish to be limited to the details herein disclosed, otherwise than as set forth in the claims, but what I claim is:

1. A duplex hydraulic broaching machine comprising a pair of alternately operative and oppositely moving broaching slides, a separate work support for each broaching slide, means to move said work supports simultaneously and oppositely to loading and broaching positions, hydraulic devices to clamp the work on a work support only after said support and work have been fully moved to broaching position, control devices operatively interlocking said work support and said clamping devices and automatically preventing movement of said work supports so long as either clamping device is operative, and said control devices including electric control circuits and switches therefor associated with said clamping devices and operated by application of or reversal of pressure in said clamping devices.

2. A duplex hydraulic broaching machine comprising a pair of alternately operative and oppositely moving broaching slides, a separate work support for each broaching slide, means to move said work supports simultaneously and oppositely to loading and broaching positions, devices to clamp the work on a work support only after said support and work have been fully moved to broaching position, and control means operatively interlocking said several parts thereby providing that the successive operative movements of the machine must be performed in predetermined sequence, and said control means including electric control circuits, circuit-changing devices and a single manually-operated switch effective by successive closings to cause or permit said successive operations in said predetermined sequence only.

KENNETH C. MONROE.